(12) United States Patent
Triess et al.

(10) Patent No.: US 9,191,467 B2
(45) Date of Patent: Nov. 17, 2015

(54) GATEWAY MODULE FOR A COMMUNICATIONS SYSTEM, COMMUNICATIONS SYSTEM, AND METHOD FOR TRANSMITTING DATA BETWEEN USERS OF A COMMUNICATIONS SYSTEM

(71) Applicants: Burkhard Triess, Ludwigsburg (DE); Michael Schaffert, Leonberg (DE); Thomas Hogenmueller, Leonberg-Gebersheim (DE); Herbert Leuwer, Backnang (DE)

(72) Inventors: Burkhard Triess, Ludwigsburg (DE); Michael Schaffert, Leonberg (DE); Thomas Hogenmueller, Leonberg-Gebersheim (DE); Herbert Leuwer, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/014,766

(22) Filed: Aug. 30, 2013

(65) Prior Publication Data
US 2014/0133350 A1 May 15, 2014

(30) Foreign Application Priority Data
Sep. 5, 2012 (DE) .......................... 10 2012 215 765

(51) Int. Cl.
*H04L 12/28* (2006.01)
*H04L 29/06* (2006.01)
*H04L 12/66* (2006.01)
*H04L 12/24* (2006.01)

(52) U.S. Cl.
CPC ............... *H04L 69/18* (2013.01); *H04L 12/66* (2013.01); *H04L 29/06* (2013.01); *H04L 41/0893* (2013.01)

(58) Field of Classification Search
CPC .................................................. H04L 2012/40
See application file for complete search history.

(56) References Cited

U.S. PATENT DOCUMENTS

| 8,130,768 | B1 * | 3/2012 | Ahrens et al. ................ 370/401 |
| 2005/0021874 | A1 * | 1/2005 | Georgiou et al. ............. 709/250 |
| 2007/0065078 | A1 * | 3/2007 | Jiang ............................... 385/76 |
| 2007/0140294 | A1 * | 6/2007 | Takatori et al. ............... 370/466 |
| 2008/0120675 | A1 * | 5/2008 | Morad et al. .................. 725/120 |
| 2008/0151916 | A1 * | 6/2008 | Jetcheva et al. .............. 370/401 |
| 2008/0212469 | A1 * | 9/2008 | Woehler et al. .............. 370/230 |
| 2010/0064082 | A1 * | 3/2010 | Ihle et al. ...................... 710/106 |
| 2011/0035793 | A1 * | 2/2011 | Appelman et al. ................ 726/9 |
| 2011/0149982 | A1 * | 6/2011 | Hwang et al. ................. 370/401 |
| 2012/0033678 | A1 * | 2/2012 | Page et al. ..................... 370/401 |
| 2012/0210417 | A1 * | 8/2012 | Shieh .............................. 726/12 |
| 2013/0073764 | A1 * | 3/2013 | Deb et al. ...................... 710/241 |
| 2014/0022912 | A1 * | 1/2014 | Kim et al. ..................... 370/244 |

FOREIGN PATENT DOCUMENTS

DE  10 2006 055513  11/2007
WO  2009/156820     12/2009

* cited by examiner

*Primary Examiner* — Edan Orgad
*Assistant Examiner* — Rebecca Song
(74) *Attorney, Agent, or Firm* — Kenyon & Kenyon LLP

(57) ABSTRACT

A gateway module for connection of at least two sub-networks is described. A first sub-network of the at least two sub-networks supports a data transmission in accordance with a first communications protocol, especially CAN, FlexRay, LIN, MOST or Ethernet, and a second sub-network of the at least two sub-networks supports a data transmission in accordance with a second communications protocol, especially CAN, FlexRay, LIN, MOST or Ethernet. The gateway module has a configurable hardware circuit which is adapted to manipulate and forward data from the first sub-network and to the second sub-network taking into consideration the first communications protocol and the second communications protocol.

22 Claims, 10 Drawing Sheets

GATEWAY MODULE FOR A COMMUNICATIONS SYSTEM, COMMUNICATIONS SYSTEM, AND METHOD FOR TRANSMITTING DATA BETWEEN USERS OF A COMMUNICATIONS SYSTEM

RELATED APPLICATION INFORMATION

The present application claims priority to and the benefit of German patent application no. 10 2012 215 765.4, which was filed in Germany on Sep. 5, 2012, the disclosure of which is incorporated herein by reference.

FIELD OF THE INVENTION

The present invention relates to a gateway module for coupling at least two sub-networks of a communications network, to the communications network formed in that manner, and to a method for transmitting data between users of such a communications system.

BACKGROUND INFORMATION

Various bus systems are known for transmitting messages between user stations or communications nodes of a communications system, for example between control units in a communications network of a vehicle. In so-called CAN bus systems, messages are transmitted using the CAN protocol described in the CAN specification in ISO 11898. Further examples of such bus systems are FlexRay, LIN, MOST and Ethernet. In many cases, the standardization is operated by a contractual alliance (consortium, association). An overview of currently used bus systems may be obtained, for example, from the following book by Werner Zimmermann and Ralf Schmidgall: "Bussysteme in der Fahrzeugtechnik—Protokolle, Standards and Softwarearchitektur" ("Bus systems in automotive technology—protocols, standards and software architecture"), Vieweg+Teubner, 4th edition, 2010.

A communications system is also known in which messages are transmitted with the aid of the Ethernet standard, which is defined by the IEEE 802 standards family.

AUTOSAR (AUTomotive Open System ARchitecture) refers to a development association of various companies in the automotive industry pursuing the objective of simplifying and harmonizing data communication and software exchange between control units of a vehicle. The relevant descriptions and the terminology used by Autosar may be found, for example, in the publicly available Autosar Specifications 3.2 and 4.0.

The growing volume of data in modern vehicles and the increasing networking of the vehicle both internally and outwardly make new communications technologies and architectures necessary in the vehicle in order to meet the requirements regarding safety, comfort and data rate and, at the same time, keep the complexity of the vehicle network manageable. The coupling of a plurality of communications networks of a communications system, also called sub-networks of the communications system, by a gateway is a customary approach to managing data volume. With that approach, communications nodes that communicate extensively with one another are usually placed in a common network and the gateways make specific, selected messages available in the various networks. A large proportion of the data is forwarded by a gateway usually transparently without being manipulated.

International Patent Application WO 2009/156820 A1 describes a method for establishing communication between communications nodes, in which a plurality of wireless communications networks are connected by suitable gateways to a connection network, called a backbone, and wired communication takes place between the gateways via the backbone. In that manner, the communications nodes of various communications networks are able to communicate with one another. In this case, the gateways have the task of forwarding messages or their useful data, and various possibilities for doing this are presented.

German Patent Application DE 10 2006 055 513 A1 discusses a multiprocessor gateway by which a plurality of communications networks may be connected to one another, in which a computer unit or gateway unit provided for that purpose ensures the communication between the connected communications controllers by using a system bus kept especially for the purpose.

It is problematic, however, that the discussed gateway technologies may have inadequate latency times owing to their use of known computer architectures. On the other hand, an architecture with sub-networks (meaning communications networks whose users communicate with one another via a continuous medium and using a common communications protocol) and a backbone (connection network) is only able to display its advantages properly if the communication of the sub-networks may be extended flexibly and transparently by way of the backbone while retaining quality of service (QoS) and without placing too great a load on processors.

SUMMARY OF THE INVENTION

The present invention is based on a gateway module and on a method for transmitting data in accordance with the descriptions herein.

The gateway module is suitable for the connection of two sub-networks of a communications system that each support a communications protocol (CAN, FlexRay, LIN, MOST or Ethernet), which may be different communications protocols. The gateway undertakes functions of the data transmission between the sub-networks and for that purpose has a configurable hardware circuit which undertakes the forwarding of data and, where applicable, protocol conversion in hardware without placing any load on a processor unit of the gateway module or of a higher-ranking gateway unit.

A gateway architecture of that kind renders possible the greatest possible freedom in the configuration of a communications network, especially in the networking of control units of a vehicle. Corresponding data transmission via such a gateway has very good jitter properties (above all very low system jitter) for transit and terminating traffic, a very high throughput for transit traffic, a low power consumption (since calculations for protocol processing are reduced to the necessary minimum) and a deterministic system behavior.

Advantageous further embodiments of the user station are indicated in the further descriptions herein.

The gateway module may include in a flexible layout further units, such as a security unit, a central processing unit, a signal processing unit and a feedback unit. By way of the hardware circuit, data may then be not only manipulated but also passed to further units for manipulation. In that manner, the advantages of the gateway functionalities implemented in hardware are supplemented with the aid of the hardware circuit by flexible data manipulation in further units. It is especially economical and space-saving in this case to integrate one or more of those units together with the hardware circuit and, where applicable, communications controllers on one component.

The gateway module is able, in hardware without processor participation, to unpack useful data from messages (corresponding to the removal of protocol information of the message) and correspondingly pack useful data into messages (corresponding to the removal of protocol information of the message), and is able to do so for various communications protocols. Accordingly, an efficient system is made available which handles the fundamental gateway functionalities without the participation of processors and which therefore saves on computing time and power.

In a particular embodiment, the hardware circuit permits messages of one protocol (e.g. CAN, LIN or FlexRay) to be tunneled via a communications network with a different protocol (e.g. an IP network with Ethernet protocol). Thus, messages from less powerful communications systems are tunneled via a more powerful network (Ethernet). This makes it possible to form communications systems in which gateway units are linked to one another by the more powerful network over long distances (for example between different domains in the vehicle) and are able to exchange messages from sub-networks between them (and hence, for example, between the domains of a vehicle).

The hardware circuit is capable of being used especially flexibly if it is configurable by a central processing unit (CPU), especially by writing of storage units of the hardware circuit with configuration data by the CPU.

The hardware circuit provides data classification functions, which may be also in hardware. On the basis of message identifiers it is established how those messages are to be manipulated. That is to say, the type of manipulation and forwarding by the hardware circuit, but also the type of manipulation and forwarding by other processing units of the gateway unit are established in the hardware circuit.

The present invention is described in detail hereinafter with the aid of exemplary embodiments and with reference to the accompanying drawings.

BRIEF DESCRIPTION OF THE DRAWINGS

FIG. 5 (a) shows the case of an additional protocol conversion, FIG. 5 (b) a purely tunnel gateway functionality.

DETAILED DESCRIPTION

Figure 1:
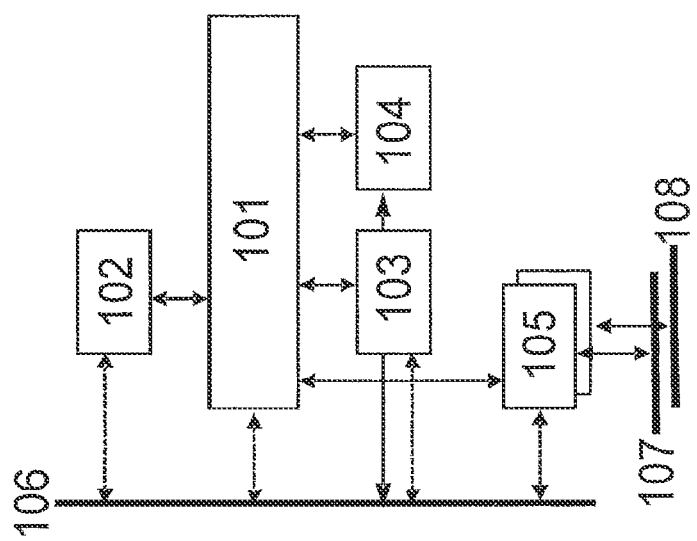
FIG. 1 shows schematically the architecture of an exemplary variant of the gateway unit according to the invention.

First of all, the terms service data unit (SDU) and protocol data unit (PDU) will be explained. SDUs are the useful data of a PDU that also possess protocol information in addition to the SDU. In the special case, messages of a multi-layer structure may be provided in which an SDU of a PDU is in turn a PDU. Example: a CAN message including CAN protocol information is packed in an Ethernet message including Ethernet protocol information. The CAN message is therefore the SDU of the Ethernet message and is itself a PDU that contains an SDU, that is, the useful data without the CAN protocol information.

The fundamental functionalities that a gateway unit or a gateway control unit (gateway ECU) is able to have include application-specific functionality, signal gateway functionality, SDU gateway functionality and tunnel functionality. In addition, further functions, such as security functions, may be provided.

Application-specific functionality means the traditional application function of an electronic control unit (ECU). Electronic control units in vehicles regulate, supervise, monitor or control various functions and perform a wide variety of calculations for that purpose. Those application-specific calculations or processing processes are not linked to the possible gateway functionality of an ECU and may to some extent be considered independently of that functionality. In a purely gateway ECU or a purely gateway unit, it is also not possible to provide any such application-specific functionality at all.

The signal gateway functionality refers to a gateway functionality that processes signals received by the communications interfaces of the gateway unit as a service data unit (SDUs) encapsulated in a protocol data unit (PDU). A signal gateway is able to combine, incorporate, duplicate, reformat, generate or discard signals in various ways. In the Autosar system, the signal gateway functionality resides above the RTE (real time environment). The signal gateway is implemented in software in the related art, for example with the use of a gateway control unit—GCU) as described in German patent document DE 10 2006 055 513 A1.

The SDU or I-PDU gateway functionality processes groups of signals. A group of signals occurs as a service data unit (SDU) encapsulated in a protocol data unit (PDU). I-PDU refers to what is called an Interaction Layer Protocol Data Unit; an I-PDU may occur encapsulated in a PDU comparably to an SDU. The SDU gateway receives I-PDUs/signal groups from higher layers or SDUs from lower layers such as, for example, the interfaces of the electronic control unit (ECU) embedded in PDUs. Signal groups may be discarded, temporarily stored, queued, dispatched (e.g. as a multicast message) and replicated by the SDU gateway without alteration of their contents. In the Autosar system, the SDU gateway functionality is situated in the communications layer in the so-called PDU router (protocol unit router) and is implemented in software. The tunnel gateway functionality tunnels control message frames via packet-based communications tunnels by various transport methods, such as UDP (user datagram protocol), TCP (transmission control protocol), IP (Internet protocol), AVB (Audio Video Bridging), etc. The tunnel gateway collects and encapsulates message frames received via the ECU interfaces in formats such as CAN, FlexRay, LIN, MOST, in packets, which may be Ethernet or TCP/UDP/IP packets, or extracts in turn corresponding message frames (CAN, FlexRay, LIN, MOST) from such packets (Ethernet, TCP/UDP/IP) received from the ECU interfaces.

In the known automotive gateway units, all of those gateway functionalities are implemented in software. In that case, CPUs (central processing units), that is, the cores of microprocessors and microcontrollers, are used and also additional processors such as gateway control units (GCUs) or signal processing units (SPUs). The latter are usually programmable units optimized for signal processing. Standardized or specialized processors having specific signal processing functions are used for that purpose. They may also be implemented on a permanently assigned core of a multi-core microprocessor or on a core of a multi-core microprocessor assignable by configuration.

Security functions act on the useful data of a message and provide, for example, check sums or other check data for checking the integrity of the useful data. They may be implemented as specialized encryption hardware. It is also possible for a plurality of security units to be provided.

Contrary to the software-based gateway solutions of the related art, according to the present invention it is proposed that a specific hardware circuit be used. The specific hardware circuit (data engine—EDE) is a multi-layer data multiplexer-demultiplexer that supports various data protocols. The hardware circuit (EDE) implements data transmission in hardware. It may be implemented in an integrated gateway component or gateway chip corresponding to the architecture proposed hereinafter. The specific hardware circuit (EDE) has an arrangement for processing data in hardware, specifically the serialization of messages, the conversion of messages from one network protocol into another network protocol and the pipelining of data.

The proposed gateway architecture implements in an exemplary embodiment the SDU gateway functionality and the tunnel gateway functionality in hardware by way of the specific hardware circuit (EDE). In an exemplary embodiment, the signal gateway functionality is supported by a signal processing unit (SPU). Security functions may also be implemented by way of a special hardware unit. Between the processing units (CPU, SPU, security hardware unit, specific hardware circuit (EDE)) and the communications controllers of the gateway unit, a common communications infrastructure is established. That infrastructure has a fully interconnected connection between the communications controllers, the processing processes and the gateway processes, and has a direct connection between the communications controllers through the specific hardware circuit (EDE), avoiding software instances. In order to be able to keep a complete check on a required quality of service (QoS) for all data flows, central queuing and scheduling mechanisms are implemented. Fundamental functions of the tunnel gateway, such as data segmentation and data encapsulation, are performed in hardware in the specific hardware circuit (EDE). The hardware parallelization is increased by using a cooperative pipeline approach in the specific hardware circuit (EDE).

Whereas in the known automotive gateways each unit processes both useful data and control data, in the proposed gateway architecture the data plane and the control plane are separated. The data plane is formed by the specific hardware circuit (EDE) and, where applicable, further units (such as security hardware unit and SPU) which are in the form of slaves. The specific hardware circuit (EDE) and, where applicable, the further slave units deals or deal with the useful data traffic and are controlled in software by a master unit (CPU) which therefore represents the control plane.

The specific hardware circuit (EDE) is the core component of the data plane of the proposed gateway unit. It receives data from and transmits data to the other units of the gateway unit. The interfaces to the other units are identical for all the communications protocols and controllers used and are application-independent. The specific hardware circuit (EDE) fulfills in the serialization or prioritization of data at the input of the specific hardware circuit a master function in relation to the interfaces and the other units of the data plane which in that respect act as slaves in relation to the specific hardware circuit (EDE). That means, for example in the case of data arriving simultaneously, that the specific hardware circuit (EDE) is able to decide which data are accepted with priority. In an exemplary realization, the first steps of the data processing are, however, parallelized by the specific hardware circuit (EDE) in such a manner that the processing and acceptance capacity (bandwidth) corresponds at least to the maximum data reception rate from the direction of the interfaces, that is, the communications controllers. In that case, the input serialization is only of subordinate importance. The serialization or prioritization of outgoing data, on the other hand, is a central functionality of the specific hardware circuit (EDE) which is decisive in ensuring quality of service (QoS). Whereas a master-slave relationship (CPU to other units) prevails in the overall architecture, in the data plane a data-flow-controlled architecture is provided.

FIG. 1 shows schematically the architecture of an exemplary variant of the gateway unit according to the invention. A specific hardware circuit (EDE) 101 is connected to further units: a central processing unit 102, a signal processing unit 103, a security unit 104 and communications controllers 105 (to each communications controller, here only one connection is shown schematically; the multiple number of communications controllers is designated 105). Central processing unit (CPU) 102 controls as a master via a CPU bus 106 the slaves: specific hardware circuit (EDE) 101, signal processing unit 103, security unit 104, communications controllers 105. Communications controllers 105 are connected to a plurality of sub-networks (for example 107 and 108 here), which may be one communications controller being connected in each case to one sub-network.

In alternative forms of embodiment of the gateway unit, signal processing unit 103 and/or security unit 104, for example, may be omitted, in which case the associated functionalities may be omitted or may be assumed by another unit, for example by central processing unit 102 on a software basis or by the specific hardware circuit (EDE) on a hardware basis. Further units may also be supplemented in order to obtain additional functionalities, for example the feedback unit described later.

By way of central processing unit 102, specific hardware circuit (EDE) 101 is not only controlled but is also configured. For configurability, central processing unit 102 has storage units, such as registers, memory maps or lookup tables, in which configuration information is stored. On the basis of that information, messages are classified by specific hardware circuit (EDE) 101 on the basis of their message identifier. Classification means in this context, for example, that a decision is made for the messages on the basis of their identifier and the configuration information as to which processing steps they are to undergo, what is the priority of their manipulation and dispatch, and where the data are to be sent. The configuration information in the storage devices of specific hardware circuit (EDE) 101 may be altered by central processing unit 102, whereby the configuration takes place. That procedure may take place outside the operation of specific hardware circuit (EDE) 101. In an alternative embodiment, the gateway unit could also be implemented without central processing unit 102. In that case, both central processing unit 102 would be omitted as a control instance and a static configuration would become necessary, for example a writing of the corresponding storage units of specific hardware circuit (EDE) 101 with configuration information from a flash memory before use of the gateway unit.

The specific hardware circuit (EDE) provides a fully interconnected connection between the central processing unit with application software (CPU), the signal gateway (SPU), the SDU gateway (specific hardware circuit (EDE)) and the security unit (security hardware unit). The connection functionality of the specific hardware circuit (EDE) contains all the necessary mechanisms for the quality of service (QoS) to be ensured. The functionalities signal gateway and security are supported by specific units (SPU and security hardware unit, respectively). The functionalities SDU gateway and tunnel gateway are performed independently by the specific hardware circuit (EDE).

Communications controllers (CCs) 105 are connected as units to specific hardware circuit (EDE) 101. They send and receive message frames in an interface-specific format. They are specially adapted to cooperate with specific hardware circuit (EDE) 101. As a result, it is possible to simplify the intermediate storage of messages in CCs 105 and to delegate the prioritization of the data traffic to specific hardware circuit (EDE) 101.

Signal processing unit (SPU) 103 and security unit 104 are also connected as units to specific hardware circuit (EDE) 101. They send and receive signals to and from specific hardware circuit (EDE) 101 using a common data interface. No access control to a CPU or SPU bus 106 is necessary for that purpose.

Specific hardware circuit (EDE) 101 includes a local data memory in which the data themselves may be stored, and operates largely on the basis of links to the data. For example, depending on the application, a PDU may be stored in the central memory if it is to be tunneled, for example, through a communications network, or an SDU may be stored in the central memory if it is to be embedded in a new PDU. That makes it possible for the data traffic to pass through the specific hardware circuit (EDE) a multiple number of times for specific communications layers (for example by way of the feedback unit described in detail hereinafter) without a separate data memory being necessary for each layer, and the overall required storage space is reduced. In the case of multiple passes, an SDU, for example, is placed by specific hardware circuit (EDE) 101 in the local memory in the first pass, the link is forwarded (for example to the feedback unit), and during the second pass the link passes through specific hardware circuit (EDE) 101 and, before forwarding to, for example, communications controllers 105, the SDU is read out of the local memory again.

Central processing unit (CPU) 102 fulfills three fundamental functions. First of all application processing: here, CPU 102 processes data in accordance with an application function of the gateway ECU. A purely gateway unit or gateway ECU does not have to have corresponding application functions; on the other hand, an application ECU, that is, for example, a control unit in the vehicle which supervises and controls certain functions and processes in the vehicle but which, in addition, acts as a gateway unit, does include corresponding application functions. In relation to that function as an application, CPU 102 behaves as a normal unit of the data plane (like SPU 103, security hardware unit 104 or communications controllers 105). Furthermore, CPU 102 performs the task of a system control and management unit. That is a function of the control plane and in that function CPU 102 behaves as a master of the CPU bus. In that function, it controls all other instances and units acting as slaves. The third function of configuration has already been described above. In that case also, CPU 102 acts as a master.

The security function, which may be implemented in the form of a specialized security or encryption hardware unit 104, appears to specific hardware circuit (EDE) 101 as a further unit. Implementation of security functions outside specific hardware circuit (EDE) 101 avoids negative blocking effects which might otherwise arise owing to the complex encryption and decryption calculations. This does, however, make it necessary that data for which security or encryption functions are to be used have to pass through specific hardware circuit (EDE) 101 twice. Once in the unencrypted state and once in the encrypted state.

A further unit in accordance with an exemplary embodiment of the gateway unit is the so-called feedback unit. This provides a data path between output of specific hardware circuit (EDE) 101 and input of specific hardware circuit (EDE) 101. This creates a data path for data that have to pass through specific hardware circuit (EDE) 101 twice. This becomes necessary, for example, when it is not possible for the working steps of two protocol layers to be carried out in one pass through specific hardware circuit (EDE) 101. An example of this is described for the tunnel functionality with reference to FIG. 5(a). The feedback unit may be implemented in the form of a further hardware unit, which may be integrated with the specific hardware circuit (EDE).

Figure 2:
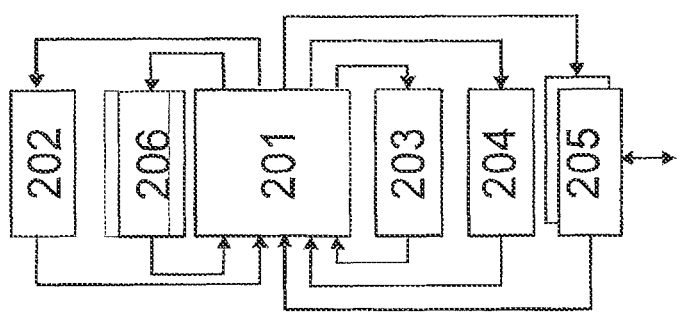
FIG. 2 shows schematically the possible data flow in an exemplary embodiment of the gateway unit according to the invention.

FIG. 2 shows schematically the possible data flow in an exemplary embodiment of the gateway unit according to the invention. Data from sub-networks are received by communications controllers 205 of the gateway unit. The data are transmitted from communications controllers 205 to specific hardware circuit (EDE) 201. There, the data are manipulated in hardware, that is, on a hardware basis, for example are converted into a new data format, and may be transmitted from the output of specific hardware circuit (EDE) 201 directly via communications controllers 205 again to desired sub-networks. In addition to manipulation, specific hardware circuit (EDE) 201 also undertakes upon input of data the functions already described above of serialization or prioritization and classification of the data.

From the output of specific hardware circuit (EDE) 201 the data may alternatively be transmitted to security unit 204 if security functions (encryptions or decryptions, check sum checking etc.) are to be applied to the data. After optionally passing through security unit 204, the data are again transmitted to the input of specific hardware circuit (EDE) 201.

Also optionally, data may also be transmitted from the output of specific hardware circuit (EDE) 201 to signal processing unit (SPU) 203. This takes place with data that are to be manipulated by the processor unit of signal processing unit 203 with the aid of its software or firmware functions. After such a pass through signal processing unit 203, the data are again transmitted to the input of specific hardware circuit (EDE) 201.

Also optionally, data may also be transmitted from the output of specific hardware circuit (EDE) 201 to central processing unit (CPU) 202. This takes place with data that are to be manipulated by the processor unit of the central processing unit with the aid of software or firmware functions, for example for application-specific processing. After such a pass through central processing unit 202, the data are again transmitted to the input of specific hardware circuit (EDE) 201.

Also optionally, data may also be transmitted from the output of specific hardware circuit (EDE) 201 to feedback unit 206. This takes place with data that are to be passed from the output of specific hardware circuit (EDE) 201 to the input of the specific hardware circuit (EDE) again without manipulation, because they are to pass through the specific hardware circuit (EDE) twice. After such a pass through the feedback unit, the data are accordingly transmitted to the input of specific hardware circuit (EDE) 201.

Once the data have passed through specific hardware circuit (EDE) 201 one or more times and, where applicable, through one or more of the other units (202-204, 206), they may be transmitted from the output of specific hardware circuit (EDE) 201 to communications controllers 205 from which they are sent to sub-networks of the communications system.

There now follows a description, inter alia with reference to data flows, of how central gateway functionalities are provided by the proposed gateway architecture.

SDU Gateway Functionality

A protocol data unit is received by a communications controller. The header or the protocol information of the data unit is removed and the resulting service data unit is stored in a standard queue in the case of a unicast transmission or, in the case of a multicast transmission, is assigned to a multicast group which is linked to a list of standard queues that are to be used. The queue scheduling unit empties the queues asynchronously according to the requirements of the output interfaces. An interface-specific header is attached to the SDU before it leaves the system (accordingly as a PDU). That operation is fully covered in the specific hardware circuit (EDE). No load is placed on the CPU as a processing unit for that purpose, but rather the CPU accompanies that gateway functionality merely as a control or configuration instance.

The proposed gateway architecture therefore may possess a specific hardware circuit (EDE) which is adapted, as a master of a data plane, to unpack on a hardware basis service data units from protocol data units in accordance with a first data protocol and to pack those service data units into protocol data units in accordance with a second data protocol. Thus, protocol data units in accordance with a first data protocol may be received from a first sub-network through communications controllers of the gateway unit, may be converted by the specific hardware circuit (EDE) into protocol data units in accordance with a second protocol, and may be sent via communications controllers of the gateway unit to a second sub-network. This applies to the case where the service data units of the protocol data unit are to be transferred by the gateway unit unchanged and unprocessed, that is to say, when merely the control data or protocol data or the format of the information or messages are or is to be changed and not their useful data content. The sub-networks are, for example, CAN, FlexRay, MOST, LIN or Ethernet communications systems.

Figure 3:
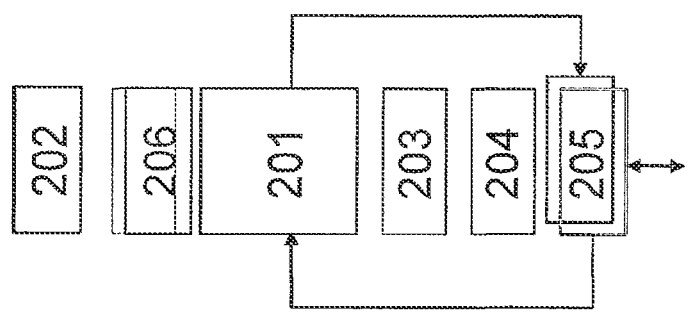
FIG. 3 shows schematically the data flow in an exemplary embodiment of a gateway unit according to the invention for a transmission using SDU gateway functionality.

FIG. 3 shows schematically the data flow for the case of the SDU gateway functionality using the example of an exemplary gateway architecture. Data of a first sub-network, for example a CAN bus, should be transmitted via the gateway unit to a second sub-network, for example a FlexRay bus, without its being necessary to manipulate the message contents of the message that is to be transmitted. For that purpose, the message or messages to be transmitted are received via the appropriate communications controller of communications controllers 205 (in the CAN format in the example). The message is transmitted to specific hardware circuit (EDE) 201. There, the message is unpacked, that is, the protocol-specific information is removed or the service data unit is extracted from the protocol data unit. This takes place in specific hardware circuit (EDE) 201 without the participation of a processing unit (that is to say without the participation of central processing unit 202 or signal processing unit 203). Where applicable, security functions of security unit 204 could also be applied (contrary to the illustration in FIG. 3). Feedback unit 206 is not employed in this described gateway case. The new message (protocol data unit), containing FlexRay protocol information in the example, is transmitted from the output of specific hardware circuit (EDE) 201 to the appropriate communications controller of communications controllers 205 and from there to the desired sub-network (a FlexRay sub-network in the example). If a message of a sub-network is to be transmitted to a sub-network that uses the same communications protocol (e.g. from CAN to CAN), either the message may be looped through specific hardware circuit (EDE) 201 directly as a PDU or the protocol information may be exchanged in accordance with the foregoing description. The latter may be implemented if the protocol information used for priority control or arbitration in the sub-network is to be altered.

Signal Gateway Functionality

A protocol data unit is received by a communications controller. As in the case of the SDU gateway, the service data unit is extracted from the protocol data unit by the specific hardware unit. The signal gateway describes, however, the case where the useful data content of the information or messages, that is, the service data unit, is to be altered or manipulated. For that purpose, either software or firmware in a CPU of a microprocessor or, for example, in a specialized SPU is necessary (also called a GCU, gateway control unit, in a gateway). The service data unit unpacked by the specific hardware circuit (EDE) is for that purpose sent, in an exemplary embodiment, to the signal processing unit SPU which carries out the desired signal processing processes. Alternatively, forwarding to and corresponding manipulation by the CPU would be possible. That would lead to a saving in a special SPU, but would place an additional load on the CPU. Since, in the exemplary embodiment, the SPU is disposed outside the specific hardware circuit (EDE), the processing does not affect the operation of the specific hardware circuit (EDE). Output data, that is, the resulting service data unit after processing by the SPU, are not sent directly to the output interfaces but pass through the specific hardware circuit (EDE) once more. In that pass, the manipulated service data units, for example, are packed once more into the provided protocol data units by the specific hardware circuit (EDE) or are converted by the specific hardware circuit (EDE), that is to say, the correct protocol information is attached to the SDUs. The message scheduling function transfers the message frames to the desired output interfaces.

The signal processing function therefore receives signal groups from the specific hardware circuit (EDE). The signal processing unit appears to the specific hardware circuit (EDE) as a further unit. A plurality of signal processing units is also possible in the proposed architecture. The implementation of the signal processing function outside the specific hardware circuit (EDE) prevents blocking effects due to complex signal processing calculations. That does, however, make it necessary for the data packets to pass through the specific hardware circuit (EDE) twice, once as unprocessed or unmanipulated data and once after signal processing.

The proposed gateway architecture therefore may possess a specific hardware circuit (EDE) which is adapted, as a master of a data plane, to unpack on a hardware basis service data units from protocol data units in accordance with a first data protocol, to send the service data units to a processing unit (a processor, such as a CPU or an SPU) for further processing implemented in software, firmware or hardware, to receive the output service data units from the processing unit after manipulation by the processing unit and to pack in hardware the manipulated service data units into protocol data units in accordance with a second data protocol. Thus, protocol data units in accordance with a first data protocol may be received from a first sub-network by communications controllers of the gateway unit, may be converted by way of the specific hardware circuit (EDE) into protocol data units in accordance with a second protocol and may be sent by way of communications controllers of the gateway unit to a second sub-network, the service data units being manipulated in software by a processor in an intermediate processing step. This applies, therefore, to the case where the service data units of the protocol data unit are to be both transferred and altered by the gateway unit, that is to say, not only are or is the control data or protocol data or the format of the information or messages to be altered but also the useful data content thereof. The sub-networks are, for example, CAN, FlexRay, MOST, LIN or Ethernet communications systems.

Figure 4:
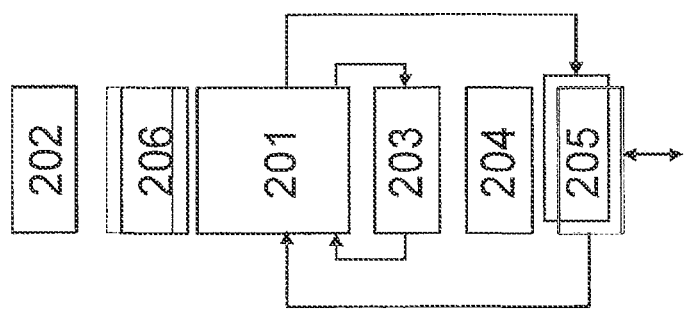
FIG. 4 shows schematically the data flow in an exemplary embodiment of a gateway unit according to the invention for a transmission using signal gateway functionality.

FIG. 4 shows schematically the data flow for the case of the signal gateway functionality using the example of an exemplary gateway architecture. Data of a sub-network are received by the appropriate communications controller of communications controllers 205. For example, the data of a LIN sub-network are received. The LIN message is transmitted to specific hardware circuit (EDE) 201. Accordingly, the unmanipulated data pass through specific hardware circuit (EDE) 201. In that operation, the service data units may be unpacked from the protocol data units, for example as already described above. From the output of the specific hardware circuit (EDE) the service data units are transmitted to signal processing unit 203, which may be implemented by a specialized SPU, a processor with specialized firmware. Signal processing unit 203 manipulates the data and transmits them to the input of specific hardware circuit (EDE) 201 again. There, the manipulated or processed data pass through specific hardware circuit (EDE) 201. There, the manipulated service data units, for example, are packed into the desired protocol data units (e.g. into CAN protocol data units). From the output of specific hardware circuit (EDE) 201 the protocol data units are then transmitted via the appropriate communications controller of communications controllers 205 to the desired sub-network (a CAN sub-network in the example).

Tunnel Gateway Functionality

The tunnel gateway is capable of embedding data from a plurality of communications controllers in a single conversation. In an exemplary embodiment, messages of one or more sub-networks are embedded with a common data format or with different data formats in Ethernet messages, for example AVB in accordance with P1722(a), or, for example, are transmitted via a UDP, TCP or IP network. In the case of the tunnel gateway, it is not necessary in principle to unpack the service data units from the corresponding protocol data units received via communications controllers, since the complete protocol data units (also a plurality of protocol units also in accordance with a plurality of communications protocols) may be packed into the tunnel messages sent. Provision may, however, be made that messages in accordance with a first protocol are first to be converted into a second protocol before tunneling, for example if those data are to be dispatched via the tunnel gateway functionality together with other data of the second protocol. For example, it may be provided that data from a CAN sub-network are embedded in a tunnel message together with data from a FlexRay sub-network. For that purpose, the service data units may then be unpacked, for example, from the CAN protocol data units and packed into FlexRay protocol data units in the specific hardware circuit (EDE) and, in a further pass through the specific hardware circuit (EDE), the FlexRay protocol data units may be embedded together with further received FlexRay protocol data units in an Ethernet or IP message. The suitable protocol information, for example P1722(a) information, is attached in the specific hardware circuit (EDE). The communications controllers then add, for example, an AVB multicast Ethernet group address as the destination address, and the MAC address of the gateway unit is added to the packet as the source address.

The proposed gateway architecture therefore may possess a specific hardware circuit (EDE) which is adapted, as a master of a data plane, to pack or embed on a hardware basis protocol data units (received by one or more communications controllers from one or more sub-networks) in accordance with at least a first data protocol in tunnel messages of a second data protocol. The tunnel messages may be formed in accordance with an Ethernet protocol, especially an AVB protocol, and are dispatched via corresponding interfaces, which may be via an AVB, a UDP, a TCP or an IP network. If required, protocol data units in accordance with a first data protocol may be received beforehand from a first sub-network by communications controllers of the gateway unit, may be converted by the specific hardware circuit (EDE) into protocol data units in accordance with a second data protocol and those protocol data units may be packed or embedded (where applicable with further protocol data units) in tunnel messages of a third data protocol. The sub-networks are, for example, CAN, FlexRay, MOST, LIN or Ethernet communications systems.

Figure 5:
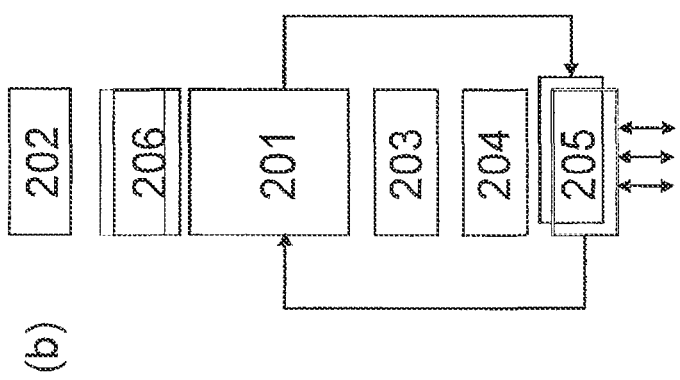
FIG. 5 shows schematically the data flow in an exemplary embodiment of a gateway unit according to the invention for a transmission by tunnel gateway functionality.
Figure 5:
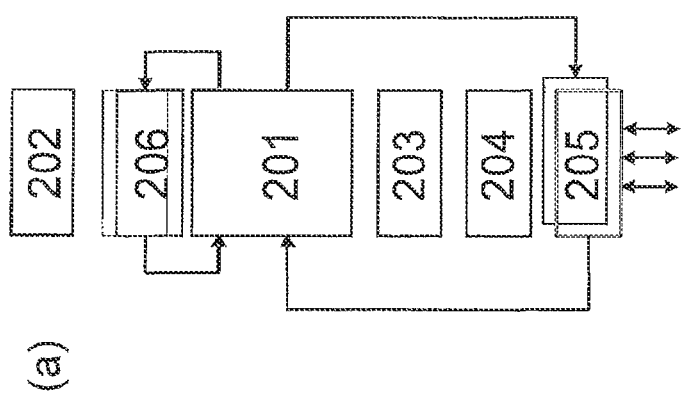

FIG. 5 shows schematically the data flow for the case of the tunnel gateway functionality using the example of an exemplary gateway architecture. In the case of FIG. 5(*a*), messages from a first sub-network and from a second sub-network, for example a CAN sub-network and a FlexRay sub-network, are received by the appropriate communications controllers of communications controller 205 and are transmitted to specific hardware circuit (EDE) 201. If it is then desired that the data of the two sub-networks be tunneled together in one message through a third network, then at least some of the data must pass through the specific hardware circuit (EDE) twice. If, in the example mentioned above, the messages of the two sub-networks are to be embedded in the tunnel message in the CAN format, the FlexRay messages have to pass through specific hardware circuit (EDE) 201 first in order to undergo a protocol conversion from FlexRay to CAN. From the output of specific hardware circuit (EDE) 201 the data are then transmitted via feedback unit 206 back to the input of specific hardware circuit (EDE) 201. There, they may then be embedded in a tunnel message together with the data from the other sub-network (the CAN sub-network in the example). Embedding in an Ethernet message may take place in this case. That message is then transmitted by specific hardware circuit (EDE) 201 to the appropriate communications controller of communications controllers 205 and may be transmitted from there to the desired sub-network. In the example, the sub-network is a TCP, IP, AVB or UDP network in accordance with an Ethernet communications protocol, and the CAN messages are tunneled through that network.

FIG. 5(*b*), on the other hand, shows the case where only one pass is necessary through specific hardware circuit (EDE) 201 even in the case of the tunnel functionality. This may be the case, for example, when only messages of the same protocol type are to be tunneled via a sub-network of another protocol type or when messages of different protocol types are to be tunneled via a sub-network of another protocol type without matching of the protocol type. The relevant message frames may be embedded in the relevant tunnel message during one pass through specific hardware circuit (EDE) 201. The further transmission is effected as described in relation to FIG. 5(*a*).

Figure 6:
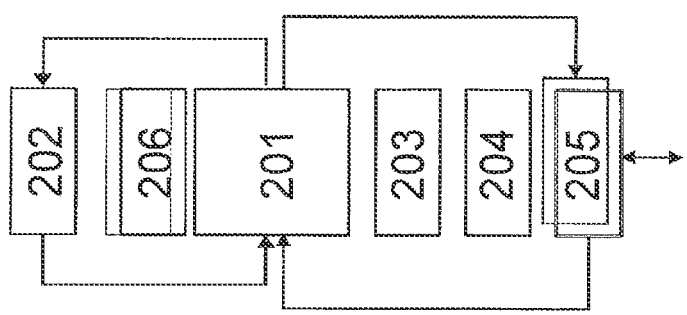
FIG. 6 shows schematically the data flow in an exemplary embodiment of a gateway unit according to the invention for the case of an application-specific manipulation of the data by a processing unit and subsequent transmission by way of a gateway functionality.

FIG. 6 shows schematically the data flow for the case of a combined application-specific manipulation of service data units by the CPU and a gateway transfer of the manipulated service data units to another sub-system by the specific hardware unit, using the example of an exemplary gateway architecture. The message of a sub-network is received by the appropriate communications controller of communications controllers 205 and is transmitted to specific hardware circuit (EDE) 201. There, the service data unit may be unpacked from the protocol data unit. The unpacked service data unit is then transmitted by specific hardware circuit (EDE) 201 to central processing unit 202 and may there be processed application—specifically—in accordance with the specific open-loop control, closed-loop control and monitoring functions of the gateway ECU. The processed service data unit then passes through the specific hardware circuit (EDE) again, is able to be converted therein into a desired protocol data unit and may be transmitted via the appropriate communications controller of communications controllers 205 to the desired sub-network.

It is fundamentally possible for security functions (especially cryptographic functions) to be implemented in the exemplary gateway architecture in addition to the described functions by additionally passing the data through security unit 204. In FIGS. 3 to 6, there would then be an additional data loop from specific hardware circuit (EDE) 201 to security unit 204, as shown in Figure b. It is also fundamentally possible for a plurality of messages of different sub-networks or also a plurality of messages of identical sub-networks to be manipulated, packed or processed together in the proposed gateway architecture.

The described gateway unit in accordance with the proposed architecture, especially including the described specific hardware circuit (EDE), may be integrated in a standard application ECU or may be implemented in the form of a specialized gateway ECU.

In a communications system having a plurality of sub-networks, for example distributed over various vehicle domains, the sub-networks or the domains may have a gateway unit in accordance with the described architecture. Messages of a sub-network are received via communications controllers and forwarded to the specific hardware circuit (EDE). By classification by the specific hardware circuit (EDE), it is recognized on the basis of the respective message identifier how the message is to be handled and to which processing unit, for example the signal processing unit, the central processing unit or the security unit, the message has to be forwarded after passing through the specific hardware circuit (EDE) (see the remarks on classification of messages above). If the message is to be manipulated, the application-specific functionality or the signal gateway functionality of the gateway unit is used, employing processors such as the CPU or SPU for the purpose. For a purely gateway functionality (SDU gateway) and tunnel gateway functionality, no processors are subjected to any load, and especially not the main CPU; the specific hardware circuit (EDE) undertakes the transmission of messages, including protocol conversion.

The specific hardware circuit (EDE) also provides those (sub-)functions for signal gateway functionality and tunnel gateway functionality.

The illustrated architecture of the specific hardware circuit (EDE) makes it possible to forward at least high-priority data in a manner that is largely undelayed, jitter-free and latency-free. That provides new possibilities for the configuration and optimization of vehicle networks in dependence on the requirements in terms of redundancy, permissible amount of wiring work, costs and further constraints.

Figure 7:
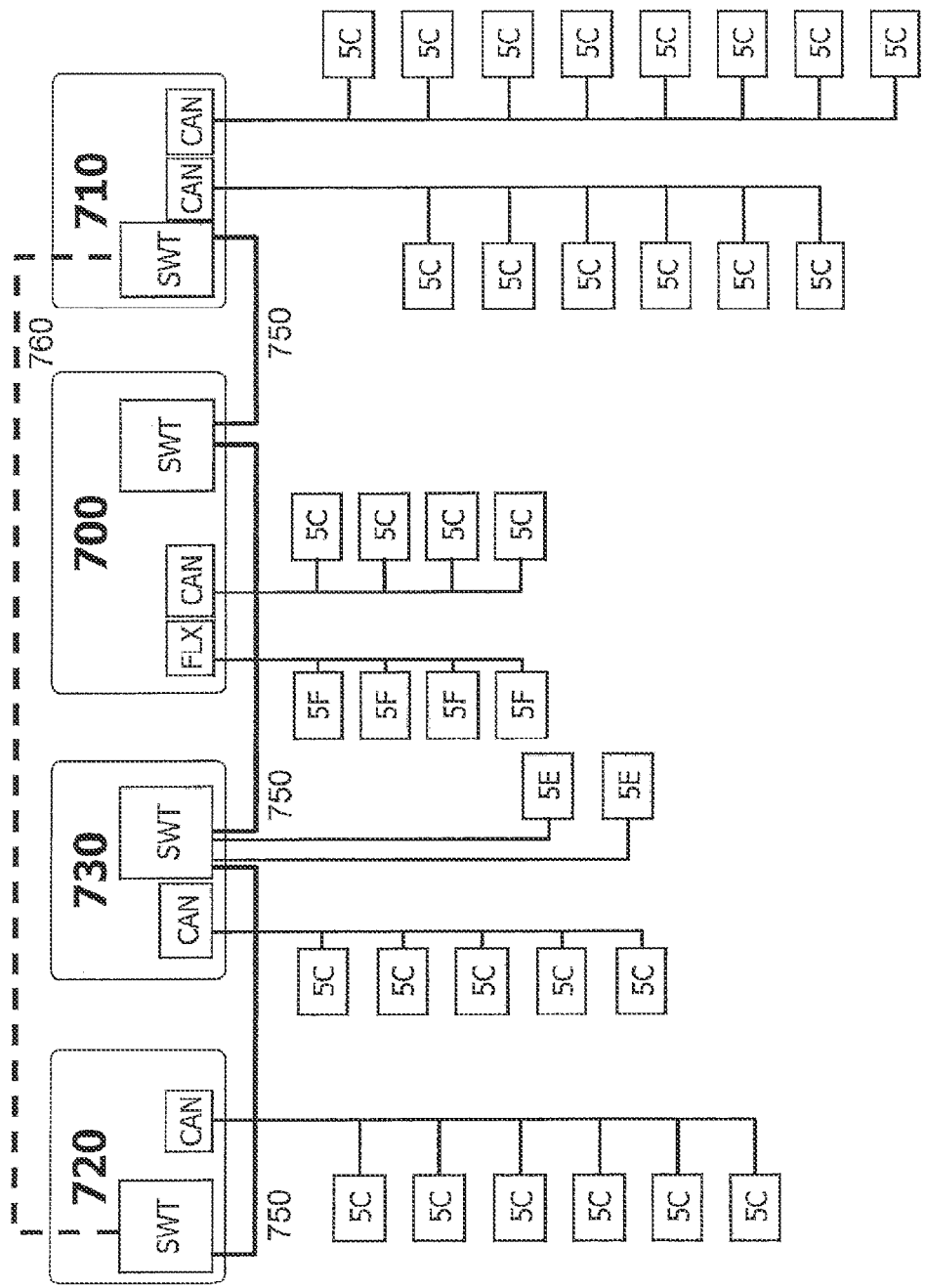
FIG. 7 shows an example of a vehicle architecture in which four gateway units are connected to one another by point-to-point connections to form a so-called daisy chain.

FIG. 7 shows by way of example a vehicle architecture in which four gateway units 700, 710, 720, 730 are connected to one another by point-to-point connections 750 to form a so-called daisy chain. By way of those connections, which may be a communication in accordance with an Ethernet standard is carried out, for example at a speed of 100 MBit/s, 1 GBit/s, 10 GBit/s depending on the available physical transmission layer. Each gateway unit includes for that purpose in the illustrated example an Ethernet switch SWT having at least three ports to form the chain arrangement. Two ports serve in this case for connection to the nearest users of the chain, and the third port connects to the respective communications node. There may also be more than three ports at a gateway unit in order to make further Ethernet connections. The communication via point-to-point connections 750 may, in addition, utilize, for example, audio-video bridging conforming to the IEEE 802.1Q standard or the IEEE 1722 standard or TCP or UDP.

In addition, a broken line indicates an optional further point-to-point connection 760 between gateway units 710 and 720, which may optionally connect the gateways to form a closed circuit. This allows a very flexible load distribution (data may be sent around clockwise or anticlockwise) and an advantageous redundancy (for example important in the event of failure of connection sections). Connected to the gateway units by respectively appropriate connection units (for example FLX for FlexRay, CAN for CAN) are sub-networks which may constitute, for example, CAN networks with user stations 5C, FlexRay networks with user stations 5F, LIN networks, wireless networks or other networks. Connected Ethernet users 5E are also able to form a sub-network, as is illustrated, for example, in FIG. 7 for gateway unit 730.

When conventional gateways are used, the problem may arise that, owing to the latency times that occur for the transmission of the data from one sub-network to another, especially via a plurality of conventional gateway units, communications nodes that are physically far away from one another must be disposed in the same sub-network.

For example, it might be necessary for wheel speed sensors to be all assigned to the same sub-network if they have to communicate with one another and/or with a brake control unit and/or with a longitudinal control unit. Assignment to different sub-networks connected by conventional gateway units could be problematic because of the latency and/or jitter that occurs in the messages. Owing to the necessary arrangement of the wheels at the corners of the vehicle, an extended communications sub-network would therefore be necessary. Determination of the assignment to the sub-networks is governed in this case by the data traffic volume and the logical grouping of the control units, and not by their physical arrangement. This leads to a great amount of wiring work, greater weight and fault-prone wiring.

Owing to the availability of the above-described gateway unit in which latency times are distinctly reduced, the sub-networks may be based on the physical arrangement, which brings with it a corresponding saving in terms of wiring. In the example given, one CAN sub-network could be disposed in each of the four corners of a vehicle. Each of those subnetworks would have one of the wheel speed sensors assigned to it, and the four sub-networks could be connected by the gateway units according to the invention to a broadband Ethernet network (an Ethernet backbone), without unduly great latency times or troublesome jitter occurring in the communication.

By closing of the daisy chain to form a closed ring, in the example described it is possible, in addition, to produce a redundancy in the communication, so that, in the event of interruption of one of the broadband connections between the gateway units, the data traffic between the sub-networks could be handled, at least for high-priority data, almost without any delay, that is, without any adverse effect on delay times and latency times or jitter, by way of the remaining communications connections.

Figure 8:
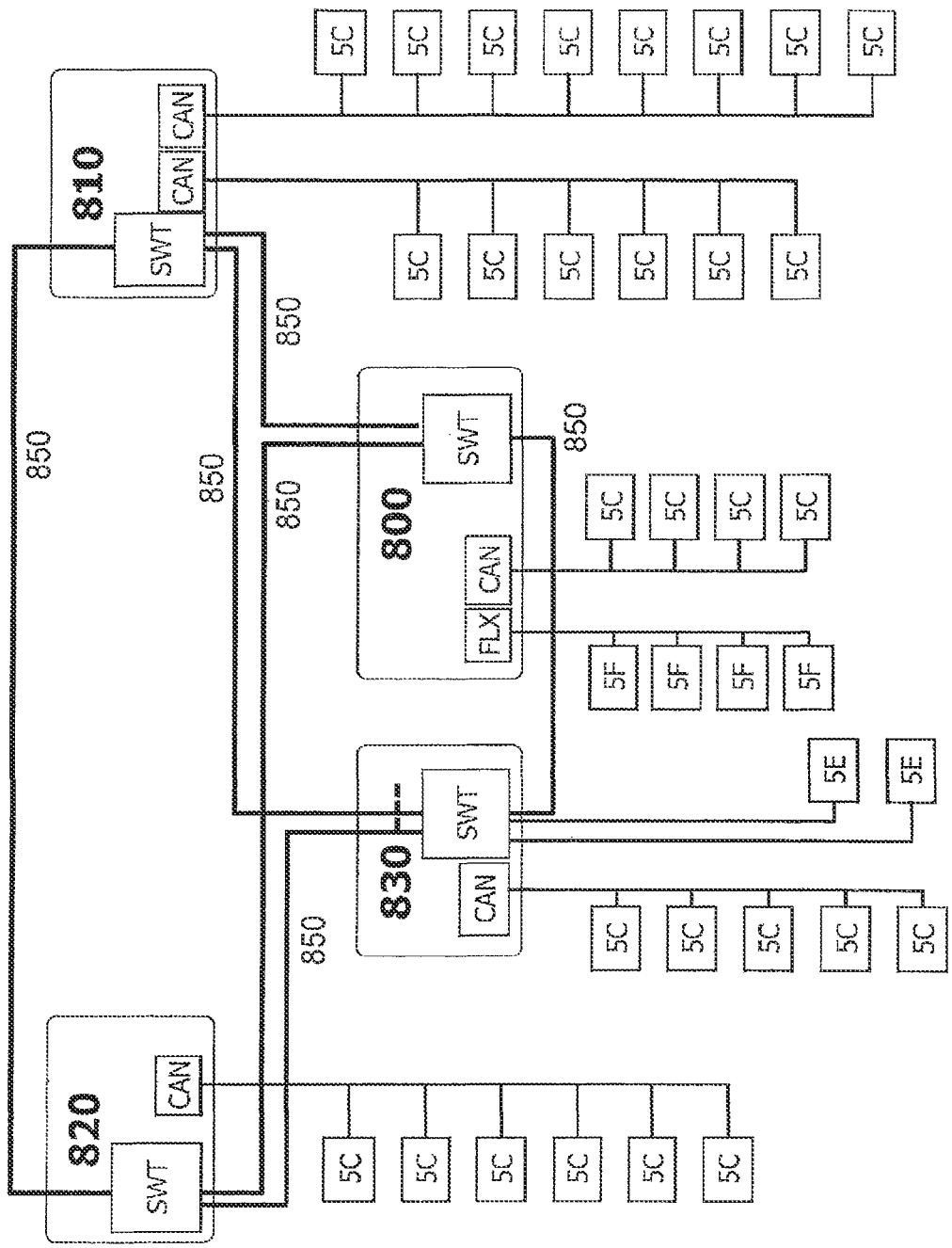
FIG. 8 shows an example of a fully interconnected network architecture.

The same applies to a fully interconnected network architecture such as that illustrated in FIG. 8. In that example, each gateway unit 800, 810, 820, 830 includes an Ethernet switch SWT with at least four ports, and each gateway unit is connected to every other gateway unit via connections 850. For a fully interconnected network architecture having five gateway units, five ports per switch SWT would be correspondingly required, for example, in each gateway unit, and so on. Partially interconnected architectures are, of course, also possible, in which some connections are omitted as compared with full interconnection. In each case, further ports may optionally be provided for making additional Ethernet connections to Ethernet users 5E. By way of connections 850, as already illustrated in FIG. 7, a communication is carried out in accordance with an Ethernet standard, for example at a speed of 100 MBit/s, 1 GBit/s, 10 GBit/s depending on the available physical transmission layer. Once again, it is possible to use, for example, AVB (IEEE 802.1Q or IEEE 1722), TCP or UDP.

The described partial or complete interconnection is able to create an increasing redundancy of the communication, so that, even if several of the broadband connections between the gateway units are interrupted, the data traffic between the sub-networks could be handled via the remaining communications connections almost without delay, that is, without any adverse effect on delay times and latency times or jitter. By using the gateway unit according to the invention it is possible to produce an optimum of redundancy and wiring work in a flexible manner depending on the demands made on the communications system.

Figure 9:
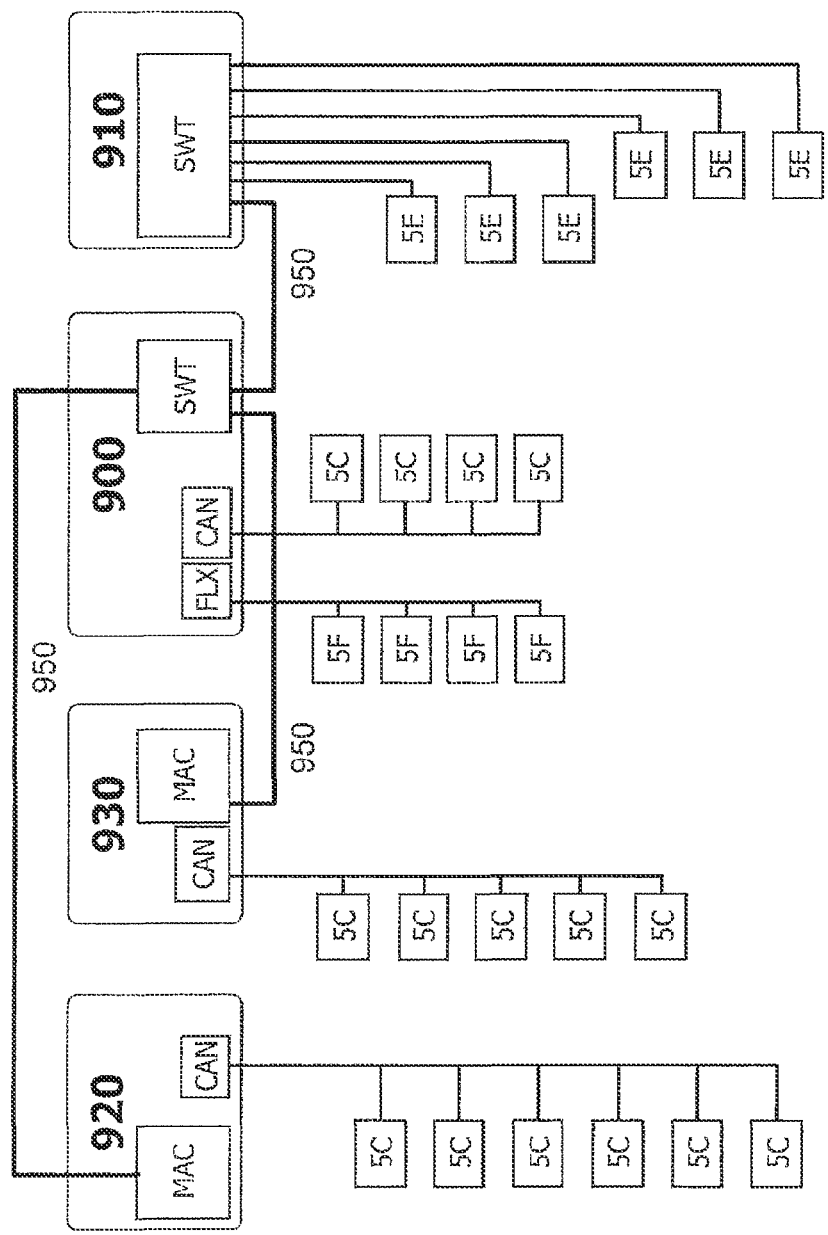
FIG. 9 shows a vehicle architecture in which two gateway units are connected to one central gateway unit.

FIG. 9 shows a further vehicle architecture that becomes possible with the use of the gateway unit according to the invention: two gateway units 920 and 930, forming the connection to connected sub-networks, for example CAN or FlexRay networks, are connected to a central gateway unit 900 via Ethernet connections 950. In FIG. 9, by way of example a CAN network with users 5C is shown at each of units 920 and 930. In the example illustrated, gateway units 920 and 930 do not contain an Ethernet switch but merely contain an Ethernet connection unit MAC which makes it possible to send and receive Ethernet-based messages via connections 950. In addition, two further sub-networks are directly connected to the central gateway unit via FlexRay connection units FLX and CAN connection units CAN, respectively, for example in this case a FlexRay sub-network with users 5F and a CAN sub-network with users 5C. Finally, from central gateway unit 900 there is a further Ethernet connection 950 to a conventional Ethernet switch 910 to which six Ethernet users 5E, for example camera systems, are connected. Via connections 950 a communication in accordance with an Ethernet standard is carried out at a speed of 100 MBit/s, 1 GBit/s, 10 GBit/s depending on the available physical transmission layer, as already described in the case of FIG. 7. Once again, it is possible to use, for example, AVB (IEEE 802.1 or IEEE 1722), TCP, IP or UDP.

The architecture illustrated in FIG. 9 is relatively inexpensive and already makes full use of important advantages of the gateway units according to the invention by virtue of the fact that the communication between the sub-networks is able to take place largely without delay and without jitter, at least for high-priority data. It does not have the scalable redundancy of the interconnected architecture illustrated in FIG. 8.

Figure 10:
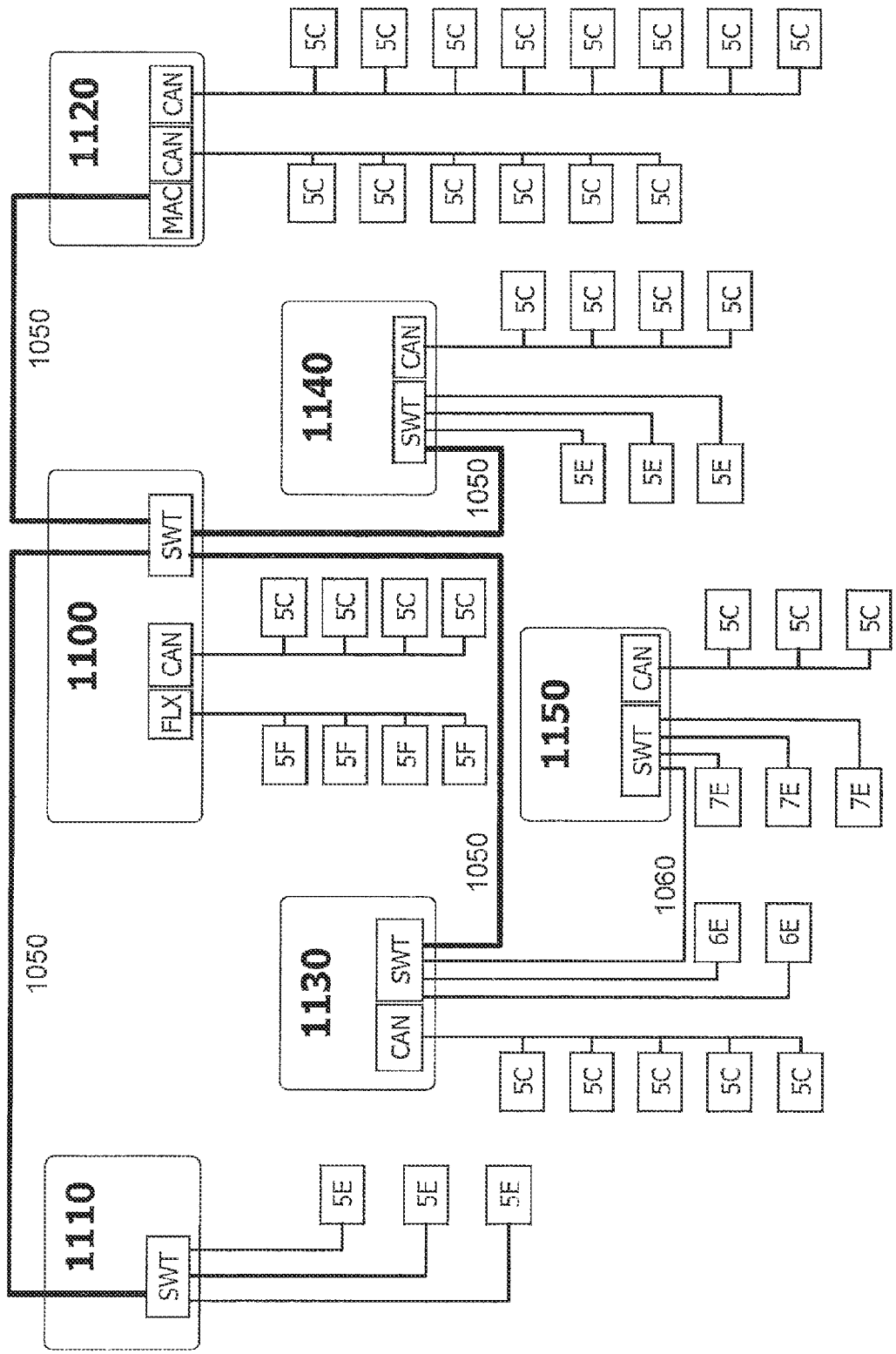
FIG. 10 shows a more complex vehicle architecture, having a plurality of gateway units, some arranged in a daisy-chain or ring architecture and some arranged hierarchically in a tree structure.

FIG. 10 shows a more complex vehicle architecture having a total of at least six gateway units according to the invention 1100, 1110, 1120, 1130, 1140, 1150, some arranged in a daisy-chain or ring architecture and some hierarchically in a tree structure. Gateway unit 1100 is in this case connected to gateway units 1110, 1120, 1130 and 1140 by point-to-point connections 1050. In addition, two further sub-networks are connected directly to gateway unit 1100 via FlexRay connection units FLX and CAN connection units CAN, respectively, in this case a FlexRay sub-network with users 5F and a CAN sub-network with users 5C. In addition to a CAN sub-network and two Ethernet users 6E, a further gateway unit 1150 is connected to gateway unit 1130 via connection 1060. Gateway unit 1150 forms in turn the connection to a CAN sub-network and further Ethernet users 7E. Also connected to gateway unit 1110 is a switched Ethernet network with users 5E. Connected to gateway unit 1140 are a switched Ethernet network with users 5E and a CAN sub-network. Finally, two CAN sub-networks with CAN users 5C are connected to gateway unit 1120. Connection unit MAC for the Ethernet connection to gateway unit 1100 forms an Ethernet connection node. No switch is required here.

The example shown in FIG. 10 is intended to illustrate the possibilities that are opened up by a corresponding gateway architecture. Data from control units of a CAN sub-network and a FlexRay sub-network of one particular vehicle domain are to be transmitted to control units of a CAN sub-network of another vehicle domain. Both vehicle domains have a domain control unit (DCU), such as, in the example illustrated, unit 1100 for the first vehicle domain and unit 1120 for the second vehicle domain, each of which has a gateway unit with a specific hardware circuit (EDE) corresponding to the foregoing descriptions. In a manner corresponding to that described with reference to FIG. 5(*a*), the FlexRay messages pass through the specific hardware circuit (EDE) and are converted in hardware into CAN message frames. The original CAN messages of the first CAN bus and the messages of the second bus converted from FlexRay into CAN format are then embedded by the specific hardware circuit (EDE) in Ethernet or IP data frames. The two domain control units 1100 and 1120 are connected to each other (and where applicable to further domain control units) via an Ethernet or IP communications structure. The CAN message frames are thus tunneled via that connection between the domain control units, embedded in the Ethernet or IP message. In the receiving domain control unit, the CAN messages are unpacked from the Ethernet message again by the specific hardware circuit (EDE) and are transmitted via the corresponding communications interfaces to the CAN sub-network of the second domain. Thus, the CAN messages and the contents of the FlexRay messages in CAN format are tunneled via the Ethernet connection between the domains. Owing to the described gateway architecture (which corresponds to an Ethernet backbone), this is able to take place without placing any load on processors, especially without placing any load on the main CPUs of the domain control units.

In the case illustrated in FIG. 10, a control unit connected to the CAN sub-network of unit 1150 could also communicate in the same manner with a control unit at one of the CAN networks connected to unit 1120. The CAN messages are tunneled via gateway units 1150, 1130, 1100 and 1120 without appreciably generating latency or jitter problems.

What is claimed is:

1. A gateway module for connection of at least two sub-networks, a first sub-network and a second sub-network, comprising:
   first and second communications controllers that send and receive data in an interface-specific format of the first sub-network and the second sub-network, respectively;
   a configurable hardware circuit connected to the first sub-network and the second sub-network via the first and second communications controllers, the hardware circuit configured to manipulate and forward data from the first sub-network, which supports a data transmission in accordance with a first communications protocol, including Controller area network (CAN), FlexRay, Local Interconnect Network (LIN), Media Oriented Systems Transport (MOST) or Ethernet, and to the second sub-network, which supports a data transmission in accordance with a second communications protocol, including CAN, FlexRay, LIN, MOST or Ethernet, taking into consideration the first communications protocol and the second communications protocol; and
   a central processing unit;
   wherein:
      the hardware circuit is implemented entirely in hardware;
      the hardware circuit is adapted to, on a hardware basis and without any processing of data units by the central processing unit, perform a protocol conversion by (i) receiving data units transmitted in accordance with the first communications protocol or the second communications protocol and (ii) packing or embedding the received data units for transmission in accordance with a different communications protocol;
      all protocol conversion at the gateway module is performed at the hardware circuit; and
      the hardware circuit is configured to, for all incoming data units received by the hardware circuit via the first and the second communications controllers, decide which of the incoming data units are accepted with priority when the incoming data units arrive simultaneously.

2. The gateway module of claim 1, further comprising:
   at least one further unit from units including a security unit, the central processing unit, a signal processing unit, and a feedback unit.

3. The gateway module of claim 1, wherein the hardware circuit is integrated with at least one further unit from units including a security unit, the central processing unit, a signal processing unit, and a feedback unit, on a common semiconductor component.

4. The gateway module of claim 2, wherein the hardware circuit is integrated with connection units for connection of the gateway module to the sub-networks on a common semiconductor component.

5. The gateway module of claim 1, wherein the hardware circuit is adapted to unpack on a hardware basis service data units from protocol data units in accordance with the first communications protocol and to pack those service data units into protocol data units in accordance with the second communications protocol.

6. The gateway module of claim 1, wherein the hardware circuit is adapted to pack or embed on a hardware basis protocol data units that are received by the first and second communications controllers from the first sub-network and the second sub-network, respectively, in at least one tunnel message in accordance with a third communications protocol.

7. The gateway module of claim 6, wherein the at least one tunnel message is formed in accordance with an Ethernet protocol or an Audio Video Bridging (AVB) protocol.

8. The gateway module of claim 1, wherein the hardware circuit is configured to prioritize outgoing data sent from the hardware circuit to the first and the second communications controllers.

9. A gateway unit, comprising:
   a gateway module for connection of at least two sub-networks, a first sub-network and a second sub-network, including:
      first and second communications controllers that send and receive data in an interface-specific format of the first sub-network and the second sub-network, respectively;
      a configurable hardware circuit connected to the first sub-network and the second sub-network via the first and second communications controllers, the hardware circuit configured to manipulate and forward data from the first sub-network, which supports a data transmission in accordance with a first communications protocol, including Controller area network (CAN), FlexRay, Local Interconnect Network (LIN), Media Oriented Systems Transport (MOST) or Ethernet, and to the second sub-network, which supports a data transmission in accordance with a second communications protocol, including CAN, FlexRay, LIN, MOST or Ethernet, taking into consideration the first communications protocol and the second communications protocol; and
      a central processing unit adapted to configure the hardware circuit;
   wherein:
      the hardware circuit is implemented entirely in hardware;
      the hardware circuit is adapted to, on a hardware basis and without any processing of data units by the central processing unit, perform a protocol conversion by (i) receiving data units transmitted in accordance with the first communications protocol or the second communications protocol and (ii) packing or embedding the received data units for transmission in accordance with a different communications protocol;
      all protocol conversion at the gateway module is performed at the hardware circuit; and
      the hardware circuit is configured to, for all incoming data units received by the hardware circuit via the first and the second communications controllers, decide which of the incoming data units are accepted with priority when the incoming data units arrive simultaneously.

10. The gateway unit of claim 9, wherein the central processing unit is adapted to execute specific application programs.

11. The gateway unit of claim 9, wherein the hardware circuit is adapted to unpack on a hardware basis service data units from protocol data units in accordance with the first communications protocol, to send the service data units to the central processing unit for further processing implemented in software, to receive output service data units from the central processing unit after manipulation by the central processing unit and to pack on a hardware basis the output service data units into protocol data units in accordance with the second communications protocol.

12. The gateway unit of claim 9, further comprising:
a signal processing unit, the hardware circuit being adapted to unpack on a hardware basis service data units from protocol data units in accordance with the first communications protocol, to send the service data units to the signal processing unit for further processing implemented in software, firmware or hardware, to receive output service data units from the signal processing unit after manipulation by the signal processing unit, and to pack on a hardware basis the output service data units into protocol data units in accordance with the second communications protocol.

13. The gateway unit of claim 9, further comprising:
a security unit, the hardware circuit being adapted to unpack on a hardware basis service data units from protocol data units in accordance with the first communications protocol, to send the service data units to the security unit for further processing implemented in software, firmware or hardware, to receive output service data units from the security unit after manipulation by the security unit, and to pack on a hardware basis the manipulated service data units into protocol data units in accordance with the second communications protocol.

14. The gateway unit of claim 9, further comprising:
a feedback unit, the hardware circuit being adapted to unpack on a hardware basis service data units from first protocol data units in accordance with the first data protocol, to pack the service data units into second protocol data units in accordance with the second data protocol, to send the second protocol data units to the feedback unit, and to receive the unchanged second protocol data units from the feedback unit.

15. The gateway unit of claim 9, further comprising:
a determining arrangement for determining, based on a classification of obtained data based on an identifier of the data, what processing of the data takes place in the hardware circuit.

16. The gateway unit of claim 9, further comprising:
at least one further unit from units including a security unit, the central processing unit, a signal processing unit, and a feedback unit; and
a determining arrangement for determining, based on a classification of obtained data on the basis of an identifier of the data, a sequence in which processing in the hardware circuit and in the at least one further unit takes place.

17. The gateway unit of claim 15, wherein the determining arrangement is integrated in the hardware circuit.

18. A communications network for connection of user stations, comprising:
at least one gateway unit, including:
a gateway module for connection of at least two sub-networks, a first sub-network and a second sub-network, including:
a configurable hardware circuit configured to manipulate and forward data from the first sub-network, which supports a data transmission in accordance with a first communications protocol, including Controller area network (CAN), FlexRay, Local Interconnect Network (LIN), Media Oriented Systems Transport (MOST) or Ethernet, and to the second sub-network, which supports a data transmission in accordance with a second communications protocol, including CAN, FlexRay, LIN, MOST or Ethernet, taking into consideration the first communications protocol and the second communications protocol;
a first sub-network, which supports data transmission in accordance with the first communications protocol and to which the gateway unit and at least one first user station are connected, the first user station having a connection unit for connection to the first sub-network and a transmitting arrangement for transmitting data using the first communications protocol; and
a second sub-network, which supports data transmission in accordance with the second communications protocol and to which the gateway unit and at least one second user station are connected, the second user station having a connection unit for connection to the second sub-network and a transmitting arrangement for transmitting data using the second communications protocol;
first and second communications controllers that send and receive data in an interface-specific format of the first sub-network and the second sub-network, respectively; and
a central processing unit adapted to configure the hardware circuit;
wherein:
the hardware circuit is implemented entirely in hardware;
the hardware circuit is connected to the first sub-network and the second sub-network via the first and second communications controllers;
the hardware circuit is adapted to, on a hardware basis and without any processing of data units by the central processing unit, perform a protocol conversion by (i) receiving data units transmitted in accordance with the first communications protocol or the second communications protocol and (ii) packing or embedding the received data units for transmission in accordance with a different communications protocol;
all protocol conversion at the gateway module is performed at the hardware circuit; and
the hardware circuit is configured to, for all incoming data units received by the hardware circuit via the first and the second communications controllers, decide which of the incoming data units are accepted with priority when the incoming data units arrive simultaneously.

19. A communications network for connection of user stations, comprising:
at least a first gateway unit and a second gateway unit, each having a gateway module for connection of at least two sub-networks, a first sub-network and a second sub-network, including:
first and second communications controllers that send and receive data in an interface-specific format of the first sub-network and the second sub-network, respectively;
a configurable hardware circuit connected to the first sub-network and the second sub-network via the first and second communications controllers, the hardware circuit configured to manipulate and forward data from the first sub-network, which supports a data transmission in accordance with a first communications protocol, including Controller area network (CAN), FlexRay, Local Interconnect Network (LIN), Media Oriented Systems Transport (MOST) or Ethernet, and to the second sub-network, which supports a data transmission in accordance with a second communications protocol, including CAN, FlexRay, LIN, MOST or Ethernet, taking into consideration the first communications protocol and the second communications protocol;

a third sub-network, which supports data transmission in accordance with a third communications protocol and to which the first gateway unit and the second gateway unit are connected; and a central processing unit adapted to configure the hardware circuit;

wherein:
the first sub-network supports data transmission in accordance with the first communications protocol and to which the first gateway unit and at least one first user station are connected, the first user station having a connection unit for connection to the first sub-network and a transmitting arrangement for transmitting data using the first communications protocol, the second sub-network supports data transmission in accordance with the second communications protocol and to which the second gateway unit and at least one second user station are connected, the second user station having a connection unit for connection to the second sub-network and a transmitting arrangement for transmitting data using the second communications protocol, the hardware circuit is implemented entirely in hardware, the hardware circuit is adapted to, on a hardware basis and without any processing of data units by the central processing unit, perform a protocol conversion by (i) receiving data units transmitted in accordance with the first communications protocol or the second communications protocol and (ii) packing or embedding the received data units for transmission in accordance with a different communications protocol, all protocol conversion at the gateway module is performed at the hardware circuit, and the hardware circuit is configured to, for all incoming data units received by the hardware circuit via the first and the second communications controllers, decide which of the incoming data units are accepted with priority when the incoming data units arrive simultaneously.

20. The communications network of claim 19, and further, Takatori et al. discloses wherein the first communications protocol is in the form of a CAN, FlexRay, LIN, MOST or Ethernet protocol, the second communications protocol is in the form of a CAN, FlexRay, LIN, MOST or Ethernet protocol, and the third communications protocol is in the form of an Ethernet protocol or Audio Video Bridging (AVB) protocol.

21. The communications network of claim 19, wherein the first gateway unit and the second gateway unit are disposed in the third sub-network, including with further gateway units, in a daisy chain, a ring, partially interconnected or fully interconnected.

22. A method for transmitting data from a first sub-network of a communications system to a second sub-network of a communications system, a first communications protocol being assigned to the first sub-network and a second communications protocol being assigned to the second sub-network, the method comprising:

receiving the data by a first communications controller of a gateway unit from the first sub-network, the data being contained in a first message in accordance with the first communications protocol;

configuring a hardware circuit of the gateway unit by a central processing unit of the gateway unit, wherein the hardware circuit is implemented entirely in hardware;

forwarding the first message with the data from the first communications controller to the hardware circuit of the gateway unit;

performing a protocol conversion at the hardware circuit, on a hardware basis and without any processing of data units by the central processing unit, wherein all protocol conversion at the gateway module is performed at the hardware circuit, and wherein the protocol conversion includes:
unpacking the data from the first message, and
packing the data into at least one second message in accordance with the second communications protocol;

forwarding the at least one second message by the configurable hardware circuit to a second communications controller of the gateway unit;

sending the data by the second communications controller to the second sub-network;

deciding at the hardware circuit, for all incoming data units received by the hardware circuit via the first and the second communications controllers, which of the incoming data units are accepted with priority when the incoming data units arrive simultaneously.

* * * * *